(12) United States Patent
Liu et al.

(10) Patent No.: US 8,401,589 B2
(45) Date of Patent: Mar. 19, 2013

(54) CONTROLLED TEXT-BASED COMMUNICATION ON MOBILE DEVICES

(75) Inventors: Yali Liu, Pleasanton, CA (US); Raghvendra G. Savoor, Walnut Creek, CA (US); Stephen Albert Sposato, Lafayette, CA (US); Michael Tisiker, Westland, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 140 days.

(21) Appl. No.: 12/853,788

(22) Filed: Aug. 10, 2010

(65) Prior Publication Data
US 2012/0040665 A1 Feb. 16, 2012

(51) Int. Cl.
*H04W 88/02* (2009.01)
(52) U.S. Cl. .................... 455/552.1; 455/456.1
(58) Field of Classification Search ............... 455/552.1, 455/456.1; 180/271
See application file for complete search history.

(56) References Cited

U.S. PATENT DOCUMENTS

| | | | |
|---|---|---|---|
| 6,771,946 B1 * | 8/2004 | Oyaski | 455/345 |
| 7,786,864 B1 | 8/2010 | Shostak et al. | |
| 7,856,203 B2 | 12/2010 | Lipovski | |
| 7,876,205 B2 * | 1/2011 | Catten et al. | 340/439 |
| 7,898,428 B2 | 3/2011 | Dietz | |
| 2009/0124376 A1 * | 5/2009 | Kelly et al. | 463/29 |
| 2011/0021234 A1 * | 1/2011 | Tibbitts et al. | 455/517 |
| 2011/0032093 A1 | 2/2011 | Miller | |
| 2011/0063098 A1 | 3/2011 | Fischer | |
| 2011/0065375 A1 | 3/2011 | Bradley | |
| 2011/0212737 A1 * | 9/2011 | Isidore | 455/466 |
| 2011/0286437 A1 * | 11/2011 | Austin et al. | 370/338 |
| 2012/0006610 A1 * | 1/2012 | Wallace et al. | 180/272 |

* cited by examiner

*Primary Examiner* — Diane Mizrahi
(74) *Attorney, Agent, or Firm* — Moazzam & Associates, LLC

(57) ABSTRACT

Devices, systems, and methods are disclosed for managing text-based services on mobile devices during the operation of a vehicle. Proactive service-controls use a time of day and location based services to determine that a mobile device is in a moving vehicle. Reactive position-awareness techniques use near-field communication (NFC) to determine that the mobile device is being operated by a user in a driver's seat of the vehicle. Upon satisfying both these determinations, specific text-based services such as messaging, browsing, etc. can be disabled by either the mobile device itself or by a network entity. The present invention can also be extended to managing other mobile device's usages in vehicles, including phone calls, online gaming, etc.

16 Claims, 5 Drawing Sheets

CONTROLLED TEXT-BASED COMMUNICATION ON MOBILE DEVICES

BACKGROUND OF THE INVENTION

1. Field of the Invention

The present invention relates to mobile devices. In particular, the present invention relates to disabling text-based communication on a mobile device in a moving vehicle.

2. Background of the Invention

Mobile devices, such as cellular telephones, are more and more ubiquitous in today's world. More powerful mobile phones with advanced features, such as smartphones having keyboards, enables various types of communication services beyond the traditional voice calls. For example, Short Message Service (SMS) is a text-based communication service, using standardized communication protocols that allow the exchange of short text messages between mobile phones. It has been shown that, despite a 100-percent price increase over the past couple of years, SMS text messaging usage is exploding more than 150 percent per year in the U.S. Further, it is worth noting that, in a recent survey, 26 percent of mobile phone users admit to driving while texting and nearly 60 percent of respondents are ages 16 to 19 (http://www.livescience.com/health/090521-dwt.html).

Texting while driving has serious negative consequences. Users who text while driving may change speeds rapidly for no reason and weave in and out of lanes. Such users are 5.36 times more likely to get in an accident than undistracted drivers (see Drivers on Cell Phones Are as Bad as Drunks: Utah Psychologists Warn Against Cell Phone Use While Driving. University of Utah press release, Jun. 29, 2006; (http://unews.utah.edu/p/?r=062206-1)). While statistics are difficult to come by, it is estimated that cell-phone distraction causes 2,600 deaths and 330,000 injuries in the United States each year. Therefore, texting while driving has become an increasing concern, especially for the parents who have teenagers.

Existing methods for controlling texting while being in a moving vehicle mainly rely on monitoring a vehicle's ignition system to prevent usage of a mobile device while driving. An ignition-monitoring module is implemented either by modifying the key or by installing a monitoring device into the vehicle (e.g., via an on-board diagnostics (ODB) port). The module connects to the mobile device via a wireless link, such as BLUETOOTH(®) and timely updates the driving status of the user, namely, driving or non-driving mode. The mobile device is locked once it goes into the driving mode (i.e., the vehicle is started) and all communication activities except emergency calls are disabled. A major drawback of this and similar approaches is that they require an association between a specific phone and the vehicle, which is completed through a setup process. Drivers can easily undermine the system by using unassociated phones. On the other hand, associated phones cannot be used even by a passenger once the vehicle is on. Therefore, the aforementioned schemes are neither effective nor flexible in practice.

What is therefore needed is a device, system, or method to disable certain features of a mobile device only while being operated by the driver of a moving vehicle.

SUMMARY OF THE INVENTION

The present invention solves the above problems by managing text-based services on mobile devices during the operation of a vehicle. Proactive service-controls determine that a mobile device is in a moving vehicle, and reactive position-awareness techniques determine that the mobile device is being operated by a user in a driver's seat of the vehicle. Upon satisfying both these determinations, specific text-based services such as messaging, browsing, etc. can be disabled by either the mobile device itself or by a network entity. The present invention can also be extended to managing other mobile device's usages in vehicles, including phone calls, online gaming, etc.

In one exemplary embodiment, the present invention is a mobile device, including a processor, a memory coupled to the processor, a cellular transceiver coupled to the processor to enable communication with a cellular network, a near-field communication (NFC) transceiver coupled to the processor to enable communication with a private network, and logic on the memory enabling the mobile device to determine that the mobile device is inside a moving vehicle, determine that the mobile device is positioned near a driver's seat in the moving vehicle, and disable one or more features of the mobile device. The logic determines that the mobile device is inside a moving vehicle by referring to a time block defined by an authorized user and determining that if a current time is within the time block then the mobile device is inside a moving vehicle. Alternatively, the logic determines that the mobile device is inside a moving vehicle by monitoring a location and rate of movement of the mobile device. The logic determines that the mobile device is positioned near a driver's seat by communicating with a plurality of NFC transceivers in the vehicle. The logic may transmit a service activation report to a server on the cellular network, and the server on the cellular network disables the one or more features in response to the service activation report.

In another exemplary embodiment, the present invention is a system for disabling features on a mobile device, including a mobile device being able to communicate with a cellular network and a near-field communications (NFC) network, a server on the cellular network, and a vehicle including a plurality of NFC transceivers to enable a determination that the mobile device is within a minimum distance of a driver's seat of the vehicle. Logic on the mobile device determines that the mobile device is inside the vehicle while the vehicle is in motion, and one or more features of the mobile device are disabled based upon the determination that the mobile device is inside the moving vehicle and that the mobile device is within said minimum distance of the driver's seat. The logic determines that the mobile device is inside a moving vehicle either by referring to a time block defined by an authorized user and determining that if a current time is within the time block then the mobile device is inside a moving vehicle, or by monitoring a location and rate of movement of the mobile device.

In yet another exemplary embodiment, the present invention is a method for disabling features on a mobile device, the mobile device being able to communicate over a cellular network and over a near-field communication (NFC) network, the method including determining that the mobile device is inside a moving vehicle, the determination including referring to a time block defined by an authorized user and determining that if a current time is within the time block then the mobile device is inside a moving vehicle, determining that the mobile device is positioned near a driver's seat in the moving vehicle, the determination including measuring a signal between the mobile device and a plurality of NFC transceivers in the vehicle, and disabling one or more features of the mobile device. Determining that the mobile device is inside a moving vehicle may further comprise monitoring a location and rate of movement of the mobile device.

DETAILED DESCRIPTION OF THE INVENTION

The present invention presents devices, systems, and methods for managing text-based services on mobile devices during the operation of a vehicle. Proactive service-controls determine that a mobile device is in a moving vehicle, and reactive position-awareness techniques determine that the mobile device is being operated by a user in a driver's seat of the vehicle. Upon satisfying both these determinations, specific text-based services such as messaging, browsing, etc. can be disabled by either the mobile device itself or by a network entity. The present invention can also be extended to managing other mobile device's usages in vehicles, including phone calls, online gaming, etc.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH(®). Communication across a network is preferably packet-based; however, radio and frequency/amplitude modulations networks can enable communication between mobile devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH(®) transceiver for communicating with a BLUETOOTH(®) device. A network typically includes a plurality of elements that host logic for performing tasks on the network.

In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network. A server hosts or is in communication with a database hosting an account for a user of a wireless communication device. The "user account" includes several attributes for a particular user, including a unique identifier of the wireless communication device(s) owned by the user, relationships with other users, application usage, location, personal settings, business rules, bank accounts, and other information. A server may communicate with other servers on different networks to update a user account.

A "vehicle," as used herein and throughout this disclosure, includes cars, trucks, and buses, as well as aircrafts and watercrafts.

A "location", as used herein and throughout this disclosure, is any physical location on an identifiable route or path (such as a road or waterway) that is specially designated for a purpose. A lane on a road can be a location. A toll booth can be a location. A location may include a geo-fence. A geo-fence is a virtual perimeter around a location such that when a smart vehicle enters or exits the location, a notification is generated. A location can be determined using radio-location via signal measurement from base stations/cell towers, using GPS/A-GPS, or using proximity to NFC transceivers. The area of the location can be controlled by the number and range of the NFC transceivers. Determining a location as a function of time enables a measurement of rate of movement, or speed.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figures 1A, 1B:
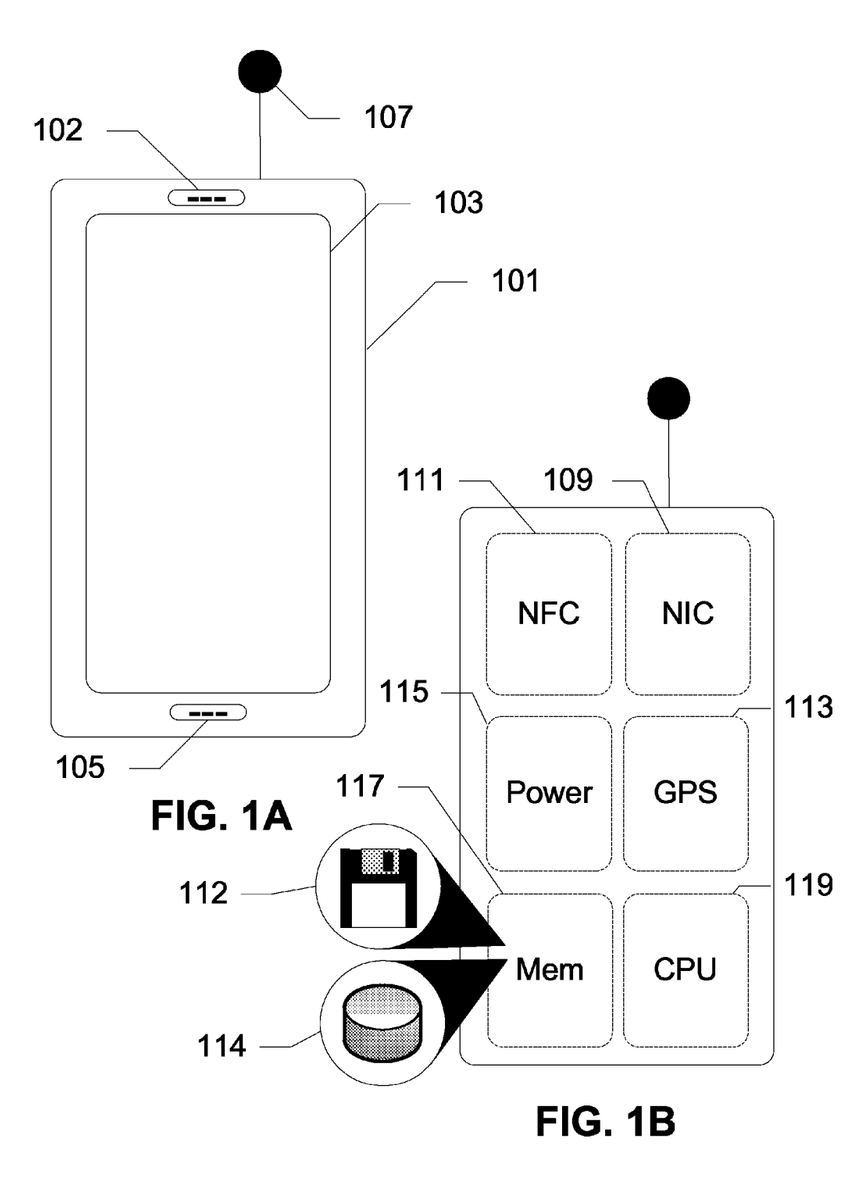
FIGS. 1A-B show a mobile device, according to an exemplary embodiment of the present invention.

FIGS. 1A and 1B respectively show the external and internal components of a mobile device 101, according to an exemplary embodiment of the present invention. Mobile device 101 includes a speaker 102, a display 103, a microphone 105, and an antenna 107. Mobile device 101 further includes a network interface (NIC) 109, a near-field communication (NFC) transceiver 111, a Global Positioning System (GPS) receiver 113, a power supply 115, a central processing unit (CPU) 119, and a memory 117. Speaker 102 provides an audio output for mobile device 101. Display 103 is an LCD or LED or other type of display on which a user can view selections, numbers, letters, etc. Display 103 can also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. Microphone 105 allows the user to verbally communicate with others using mobile device 101. Antenna 107 is a transducer designed to transmit or receive electromagnetic waves to and from a network. In conjunction with antenna 107, network interface 109 allows mobile device 101 to wirelessly communicate with a cellular network or with other wireless devices across the cellular network. Network interface 109 may be a cellular transceiver, wireless transceiver, etc., and includes combinations of transceivers to communicate with assorted wireless networks. NFC transceiver 111 enables mobile device 101 to wirelessly communicate over short ranges with other NFC devices. NFC transceiver 111 can be, for instance, a BLUETOOTH (®) transceiver. GPS transceiver 113 enables a determination of a location of mobile device 101. This location may be used in conjunction with pre-defined rules to determine that mobile device 101 is inside a moving vehicle. Power supply 115 provides power to each of the components of mobile device 101, and can include a battery, as well as an interface to an external power supply. CPU 119 controls components of mobile device 101 according to instructions in logic stored on memory 117. Memory 117 comprises any computer readable medium, such as RAM, ROM, etc. Memory 117 stores logic 112, in addition to logic for operating the components of mobile device 101. Memory 117 further stores a database 114 including a set of rules such as defined time-blocks determining when text-based services need to be controlled or disabled on mobile device 101. The rules are defined by an authorized user, for instance, a parent of a teenager who wishes to control text and other usage of the mobile device while the teenager is predicted to be driving. Consequently, database 114 is secured and can only be accessed and modified via a password or equivalent means.

Logic 112 constantly monitors whether or not a service control needs to be activated. Generally, the present invention operates in three stages: system activation, in-vehicle localization, and service control. Activation determines whether a mobile device is subject to service control. The first step in this process is to determine that the mobile device is in a moving vehicle. This can be determined in several ways. For instance, time of day and location is monitored by logic 112, which refers to database 114 to determine whether or not mobile device 101 is in a moving vehicle. In the simplest case, a mobile device 101 is in a moving vehicle when it is determined that the current time fits within a controlled time block when the user is very likely driving. This feature is ideal for situations such as an employee driving a company vehicle during work hours, or a teenager driving a parent's vehicle to and from school. Logic 112 refers to the time blocks stored in database 114, compares a current time with the time block, and if the current time falls within the time block, disables certain text-based features of mobile device 101.

A more dynamic service can be provided for in other types of situations by using the location of mobile device 101. GPS receiver 113 is employed to determine a location of mobile device 101. With this feature, the following information is readily accessible: service area (city, state, country), location (longitude, latitude, street number), moving speed, and so on. The service area information is used to determine whether a mobile device is in a service control area. For devices without a GPS receiver, a cell tower location ID (cell ID) can be used for a less accurate measurement. Cellular tower based localization can provide such information. The location and moving speed information are used to determine the mobility of the device. Regarding the service area, certain geographic locations in different states/countries have different rules and regulations regarding mobile device usage while driving. Therefore, logic 112 first considers the broad region in which mobile device 101 is being operated. Logic 112 further collects information such as speed of mobile device 101 (also accessible via GPS receiver 113), and determines that mobile device 101 is in a moving vehicle. For instance, rapid movement along a roadway is probably sufficient to activate service controls. If the parameters confirm that the mobile device is subject to the aforementioned usage-control conditions, the control system will be automatically activated. Generally, different combinations of the above conditions may depend on the different service requirements, e.g., target users, control accuracy, control flexibility, etc. It may also be limited by the implementation complexity.

As described above, the time-block based approach targets the scenario in which users are willing to use existing control options wherein their usage behaviors are normally simple and easy to predict. Particularly, this approach targets parents who would like to control their children's mobile device usage. Considering that the driving time is very predictable for teenagers due to regular school hours, parents can easily determine whether their teenagers are driving according to the time schedule. Therefore, a simple solution is to set up controlled time blocks for usage of the mobile device before and after school hours. Further, speed information derived from GPS or other location-based services can be combined with the time blocks to serve as a condition for finer service controls, such as turning off the text messaging service while the mobile device is moving. Similarly, the location-based service control can act as an add-on function to the simple parental control scheme and may be preferable for a large user population with various driving behaviors and usage-control conditions.

Once the system confirms that the mobile device meets the specified control conditions, it will automatically begin to determine the reactive position-awareness technique mentioned above. Specifically, near-field communications (NFC) is used to differentiate between a driver-held device and a passenger-held device. NFC transceivers pre-installed at one or more points in the vehicle enable a determination of the position of the mobile device within the vehicle. If the vehicle is in motion and the mobile device is near the driver's seat (determined to within a specified tolerance or threshold), the text-based messaging services will be blocked, either by the mobile device itself or by the service provider with a service-control profile. Otherwise, the services will continue to operate under normal usage conditions.

Many well established techniques can serve the purpose of this fine-resolution localization. Bluetooth, a short-range RF technology, has been widely installed in new vehicles. Using a short-range wireless signal, mobile devices equipped with Bluetooth can connect with in-vehicle Bluetooth transceivers to allow drivers to carry out their conversations hands-free. The same transceivers can be used for the proposed in-vehicle localization task. Once the system enters this phase, it automatically activates its Radio Frequency (RF) function, such as Bluetooth, WiFi and etc. If the user refuses to turn on this function, the controlled text-based messaging services will be blocked.

Figure 2:
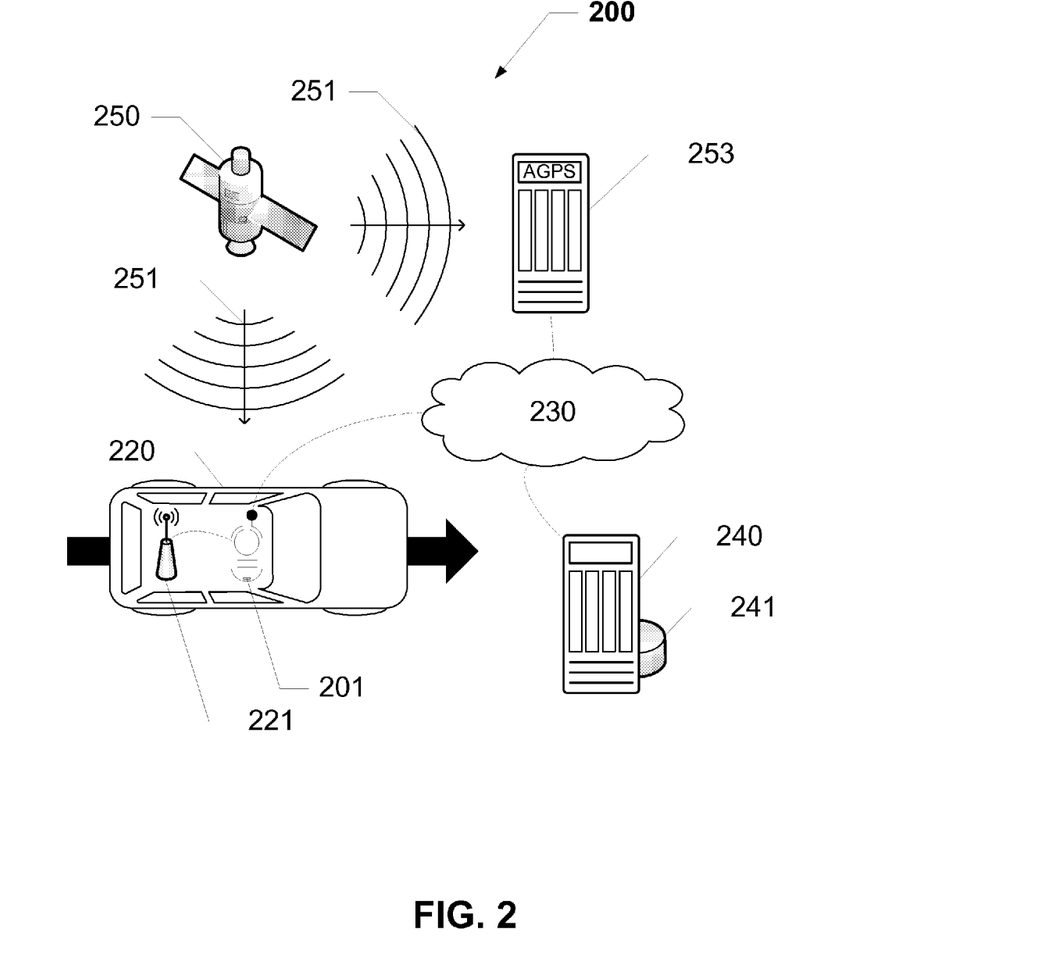
FIG. 2 shows a system for disabling features on a mobile device, according to an exemplary embodiment of the present invention.

FIG. 2 shows a system 200 for disabling features on a mobile device 201, according to an exemplary embodiment of the present invention. Mobile device 201 is inside vehicle 220. Vehicle 220 has an NFC transceiver 221 that can communicate with an NFC transceiver within mobile device 201. Mobile device 201 is further in communication with a network 230 via a cellular transceiver. Also in communication with network 230 is a server 240, for instance, an application server in an IMS system, or generally any network entity that provides text-based messaging services and/or controls a user account for a user of mobile device 201. The user account details, as well as other information such as business rules, etc. are stored in database 241. Mobile device 201 also receives a satellite signal 251 from a satellite 250, via a GPS or AGPS receiver. In an AGPS system, satellite 250 communicates with an AGPS server 253, which in turn provides additional details to mobile device 201 via network 230. This additional information is known to one skilled in the art and includes, for instance, ephemeris information, almanac information, time, etc. Other network elements that are necessary to enable system 200 are known in the art and are not shown but understood to be present, such as cell towers, proxy servers, gateways, network nodes, etc.

The logic to determine whether or not to activate service control can be located in mobile device 201, on server 240, or any combination thereof. In the first case, mobile device 201 measures a time and location as described above, using a local database of time blocks, and location information received from satellite 250 and AGPS server 253. Upon determining that vehicle 220 is in motion, mobile device 201 initiates a position-awareness mechanism by communicating with one or more NFC transceivers 221. If mobile device 201 is in a driver's seat of moving vehicle 220, then mobile device 201 shuts down or disables certain text-based features. Alternatively, mobile device 201 can generate a request to block or disable services, and transmits the request to server 240. Server 240 modifies a user account by temporarily disabling text-based services from the network itself, and activates the services upon receiving updated position/location information from mobile device 201. In an alternate embodiment, mobile device 201 simply relays a location (derived from GPS) and position (derived from NFC) information to server 240, whereupon server 240 determines that services need to be blocked, and proceeds to do so. Other combinations are possible and will become apparent to one of ordinary skill in the art in light of this disclosure.

Figure 3A:
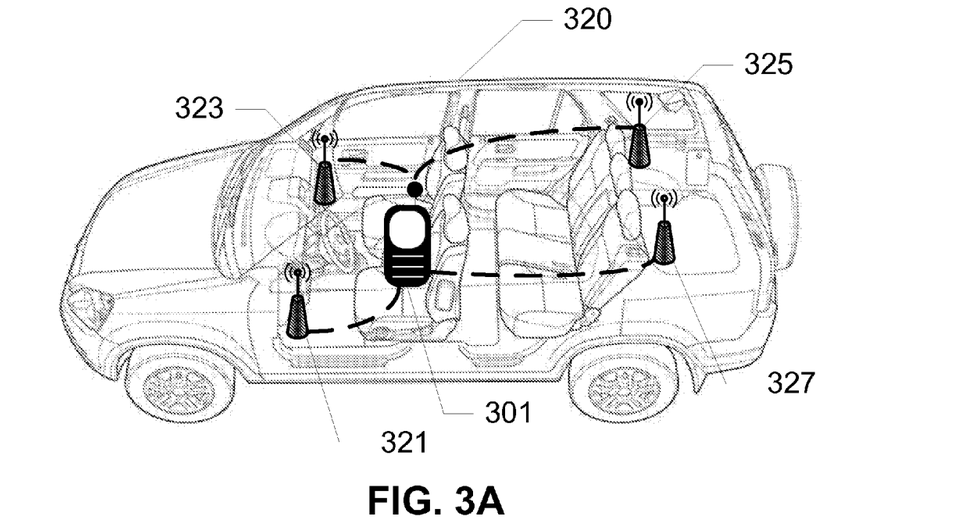
FIGS. 3A-B show the detection of a mobile device near a driver's seat of a vehicle, according to an exemplary embodiment of the present invention.
Figure 3B:
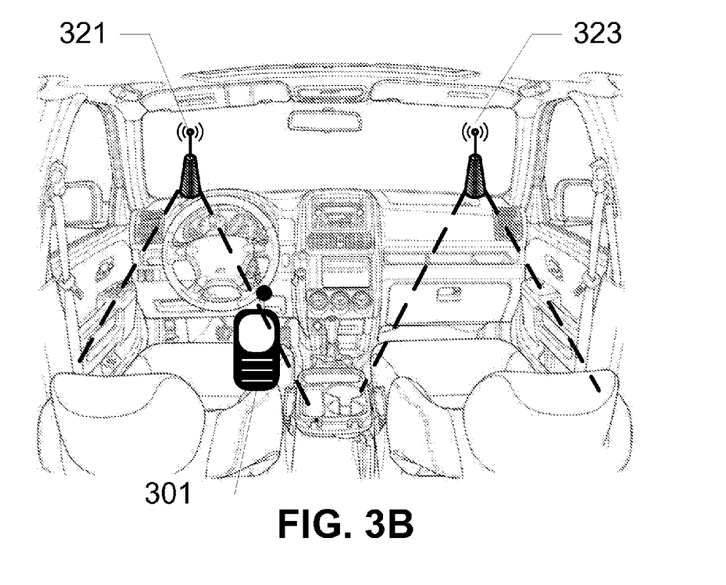

FIGS. 3A-3B show at least two ways to determine a position of a mobile device within a vehicle. The first, shown in FIG. 3A, utilizes the received signal strength from NFC transceivers within the vehicle, which is measured at the mobile device. Mobile device 301 is in communication with NFC transceivers 321, 323, 325, and 327. Based on a known transmission power of each NFC transceiver, a propagation loss for each signal from each NFC transceiver can be calculated and this loss will be translated into position information of mobile device 301, using logic within mobile device 301 itself. With different system complexity and precision requirements, coordinate information of mobile device 301 can be obtained by triangulation, hyperbolic trilateration, or multilateration techniques. The achieved coordinates will be compared with a pre-defined threshold of distances that is programmed as per the dimensions of the passenger cabin of vehicle 320, to determine who is holding mobile device 301 (i.e., driver or passenger).

In this embodiment, the total overhead is only at the mobile device. The total computation can be carried out by the mobile device alone and few modifications are needed. Present-day consumer electronics are in a constant state of evolution and this add-on does not involve a big overhead. At the same time, it provides a great freedom for the installation of NFC transceivers within vehicles. It can be easily and economically arranged based on the interior structure of the vehicle.

FIG. 3B shows an alternative method involving a determination of the location of a mobile device inside a vehicle using directional antennas. Specifically, one or multiple NFC transceivers 321 and 323, having directional antennas (e.g., a Yagi antenna) are installed in specific locations inside the vehicle. The directions of the antennas of NFC transceivers 321 and 323 are adjusted to point to specific positions. Transceiver 321 is pointed towards a driver's seat, and transceiver 323 is pointed towards a passenger seat. Transceiver 321 has a signal that only covers the space around the driver's side seat, and transceiver 323 has a signal that only covers the space around the passenger seat. A central controller (not shown) controls both NFC transceivers, and if transceiver 321 detects any signal from this area, a signal is transmitted to mobile device 301 to indicate that the position-awareness requirement is satisfied, i.e. service controls need to be implemented. The transmission power of an in-vehicle NFC transceiver should be sufficiently low to cover a specific area only. This approach provides more accurate in-vehicle location estimation and involves less power consumption compared to the approach of FIG. 3A. However, it may require a more complex design of directional antennas, and a dedicated protocol for message exchange between the mobile device and the in-vehicle NFC transceivers. The present invention allows for both as well as other alternative and methods, depending on the application, vehicle type/size, and other factors.

Upon determining that the mobile device is inside a moving vehicle and operated by a user in the driver's seat, service control will be implemented, i.e. certain text-based services will be disabled. There are several methods to achieve this. The first targets the scenario where the text-based messaging control function is managed by the mobile device. The parental control and/or in-vehicle location information would be used to turn on or turn off specific applications within the mobile device, such as the text-based messaging services.

Figure 4:
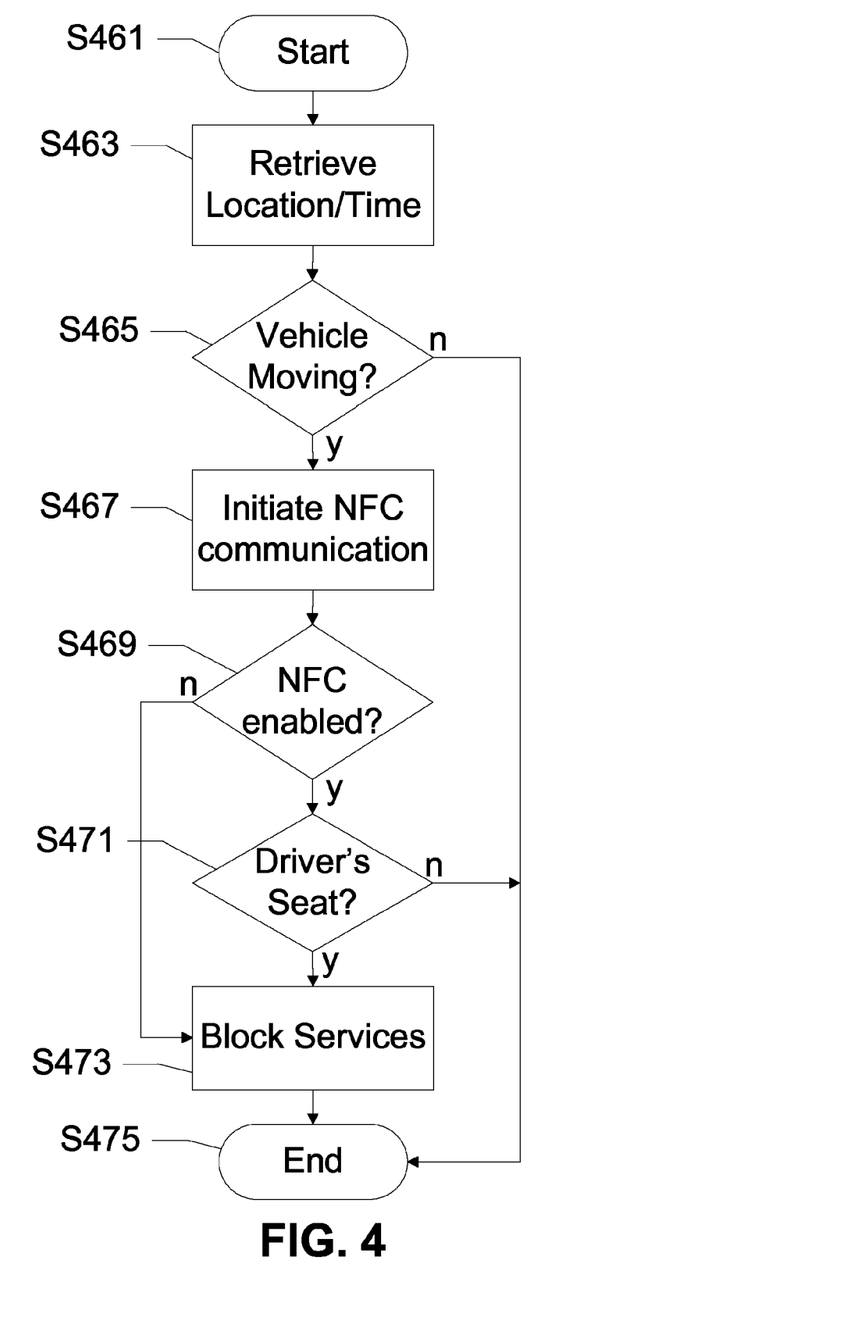
FIG. 4 shows a method for disabling features of a mobile device, according to an exemplary embodiment of the present invention.

FIG. 4 shows a method for disabling services at the mobile device, according to an exemplary embodiment of the present invention. The method begins S461 with a retrieval of a time of day, and a location of the mobile device in step S463. The mobile device measures a time and location as described above, using a local database of time blocks, and location information received from one or more of a GPS system and a cellular network. Based on the results of these measurements and time-block retrievals, a determination S465 is made as to whether or not the vehicle is in motion. If the vehicle is not in motion, the process ends S475. However, upon determining that the vehicle is in motion, the mobile device initiates a position-awareness mechanism S467 by communicating with one or more NFC transceivers within the vehicle.

To avoid fraud on the system, a failsafe mechanism is invoked in step S469. A user may disable the NFC transceiver within the mobile device, for instance by turning off BLUETOOTH, in order to "game" the system. If the mobile device is in a moving vehicle, and if the NFC transceiver is disabled, the method automatically blocks text based services S473. If, however, the NFC transceiver on the mobile device is enabled, a determination is made S471 as to whether or not the mobile device is in a driver's seat. If not, the process ends S475. If the mobile device is in a driver's seat of the moving vehicle, as determined by the techniques described above, then the mobile device shuts down or disables certain text-based features S473. This can be performed by limiting access to certain applications, or other methods. The process repeats itself to determine that the service control is no longer needed, upon which services are re-activated.

This method has the advantage that the control function is simple and easy to implement within the mobile device itself. Also, it can effectively control the device usage and can provide immediate response once the driving information is available or if the mobile device is moved away from the driver's seat. However, this is essentially a device-provider based controlling system. To implement this method, the service provider would work with all the device carriers it supports. If a subscriber simply uses an unauthorized device that does not have this service control function, this method would not apply.

Alternatively, the mobile device can generate a request to block or disable services, and transmits the request to a server on the cellular network. The server would temporarily disable text-based services from the network itself, and activate the services upon receiving updated position/location information from the mobile device. This method would be carried out through the cooperation between the local device and the service provider. Specifically, the service provider has a server on their network that maintains a service profile for each subscriber, which manages the availability for different services.

Figure 5:
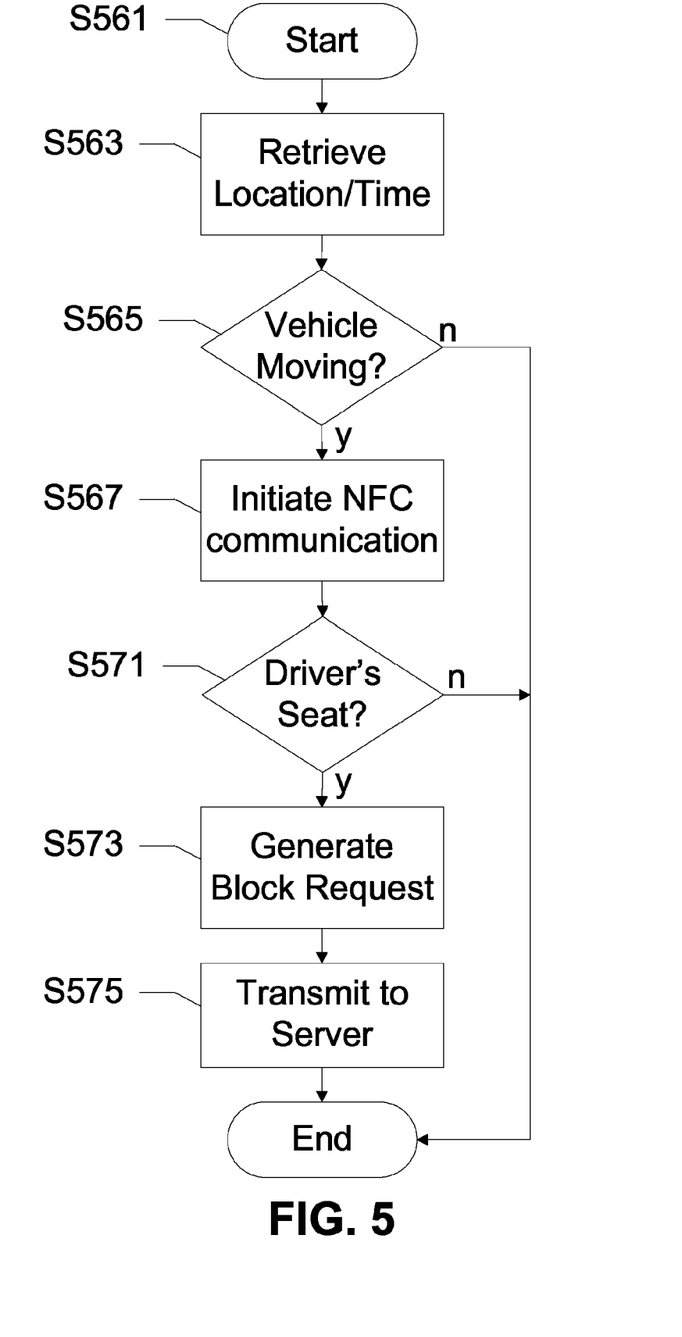
FIG. 5 shows an alternative method for disabling features of a mobile device, according to an exemplary embodiment of the present invention.

FIG. 5 shows a method for disabling services by requesting a server on the network, according to an exemplary embodiment of the present invention. The method begins S561 with a retrieval of a time of day, and a location of the mobile device in step S563. The mobile device measures a time and location as described above, using a local database of time blocks, and location information received from one or more of a GPS system and a cellular network. Based on the results of these measurements and time-block retrievals, a determination S565 is made as to whether or not the vehicle is in motion. If the vehicle is not in motion, the process ends S575. However, upon determining that the vehicle is in motion, the mobile device initiates a position-awareness mechanism S567 by communicating with one or more NFC transceivers within the vehicle. A determination is made S571 as to whether or not the mobile device is in a driver's seat. If not, the process ends S575. If the mobile device is in a driver's seat of the moving vehicle, as determined by the techniques described above, then the mobile device generates a block request S573. The block request is generated and periodically transmitted to the server S575 on the network. The block request includes the following information to update the subscriber's service profile: a time stamp, a unique device identifier (international mobile equipment identity (IMEI) or phone number), and a service control bit, which is essentially a binary bit that indicates whether the service should be blocked. The service control bit is derived based on the statistics measured with respect to the time and location, and/or in-vehicle position information. The block request can be transmitted to the server S575 periodically, with a zero value if the location/time and position requirements are not met, or to a positive value if the requirements for service control are met. Further, a parent/boss/authorized user has priority to override this control bit. The process repeats itself to determine that the service control is no longer needed, upon which services are re-activated.

This method has the advantage that the service provider can effectively control the availability of services, although it regularly requires a transmittal of information from the mobile device. The service control protocol cannot be easily evaded by using an unauthorized device. Moreover, this method has a better scalability in that it can make use of the existing information in the service profile, such as time or location, to perform finer control schemes.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile device, comprising:
a processor;
a memory coupled to the processor;
a cellular transceiver coupled to the processor to enable communication with a cellular network;
a near-field communication (NFC) transceiver coupled to the processor to enable communication with a private network; and
logic on the memory, the logic enabling the mobile device to determine that the mobile device is inside a moving vehicle, determine that the mobile device is positioned near a driver's seat in the moving vehicle, and disable one or more features of the mobile device;
wherein the logic determines that the mobile device is positioned near the driver's seat by communicating with a plurality of NFC transceivers in the vehicle; and
wherein the logic determines that the mobile device is inside a moving vehicle by referring to a time block defined by an authorized user and determining that the mobile device is inside a moving vehicle when a current time is within the time block.

2. The mobile device of claim 1, wherein the time block is defined on the memory of the mobile device by the authorized user, and wherein the authorized user requires a password to define the time block.

3. The mobile device of claim 1, wherein the time block is defined on a user database on the cellular network via a user interface, and wherein the mobile device connects to the cellular network to refer to the time block.

4. The mobile device of claim 1, wherein the logic determines that the mobile device is inside a moving vehicle by monitoring a location and rate of movement of the mobile device.

5. The mobile device of claim 4, wherein the location and rate of movement of the mobile device is determined via using a Global Positioning System (GPS).

6. The mobile device of claim 1, wherein the logic measures a received signal strength from the plurality of NFC transceivers in the vehicle, and uses one or more of triangulation, hyperbolic trilateration, or multilateration to determine that the mobile device is positioned within a minimum distance of the driver's seat.

7. The mobile device of claim 1, wherein the plurality of NFC transceivers in the vehicle include a plurality of directional antennas to measure the position of the mobile device inside the vehicle, and inform the mobile device that the mobile device is positioned near the driver's seat.

8. The mobile device of claim 1, wherein the logic transmits a service activation report to a server on the cellular network, and wherein the server on the cellular network disables the one or more features in response to the service activation report.

9. A system for disabling features on a mobile device, the system comprising:
- a mobile device being able to communicate with a cellular network and a near-field communications (NFC) network;
- a server on the cellular network; and
- a vehicle including a plurality of NFC transceivers to enable a determination that the mobile device is within a minimum distance of a driver's seat of the vehicle,
- wherein a logic on the mobile device determines that the mobile device is inside the vehicle while the vehicle is in motion,
- wherein one or more features of the mobile device are disabled based upon the determination that the mobile device is inside the moving vehicle and that the mobile device is within said minimum distance of the driver's seat; and
- wherein the logic determines that the mobile device is positioned near the driver's seat by communicating with the plurality of NFC transceivers in the vehicle; and
- wherein the logic determines that the mobile device is inside a moving vehicle by referring to a time block defined by an authorized user and determining that the mobile device is inside a moving vehicle when a current time is within the time block.

10. The system of claim 9, wherein the time block is defined on the memory of the mobile device by the authorized user, and wherein the authorized user requires a password to define the time block.

11. The system of claim 9, wherein the time block is defined on a user database on the server via a user interface, and wherein the mobile device connects to the server via the cellular network to refer to the time block.

12. The system of claim 9, wherein the logic determines that the mobile device is inside a moving vehicle by monitoring a location and rate of movement of the mobile device.

13. The system of claim 9, wherein the logic transmits a service activation report to a server on the cellular network, and wherein the server on the cellular network disables the one or more features in response to the service activation report, the service activation report indicating that the mobile device is in a moving vehicle and within the minimum distance of the driver's seat.

14. A method for disabling features on a mobile device, the mobile device being able to communicate over a cellular network and over a near-field communication (NFC) network, the method comprising:
- determining that the mobile device is inside a moving vehicle, the determination including referring to a time block defined by an authorized user and determining that the mobile device is inside a moving vehicle when a current time is within the time block;
- determining that the mobile device is positioned near a driver's seat in the moving vehicle, the determination including measuring a signal and communicating between the mobile device and a plurality of NFC transceivers in the vehicle;
- measuring a received signal strength from the plurality of NFC transceivers in the vehicle, and using one or more of triangulation, hyperbolic trilateration, or multilateration to determine that the mobile device is positioned within a minimum distance of the driver's seat; and
- disabling one or more features of the mobile device.

15. The method of claim 14, wherein determining that the mobile device is inside a moving vehicle further comprises monitoring a location and rate of movement of the mobile device.

16. The method of claim 14, wherein disabling said one or more features further comprises transmitting a service activation report to a server on the cellular network, wherein the server on the cellular network disables the one or more features in response to the service activation report.

* * * * *